July 11, 1939.　　　F. E. MILLER　　　2,165,978
BRAKE MECHANISM
Filed Dec. 17, 1937　　　2 Sheets-Sheet 2
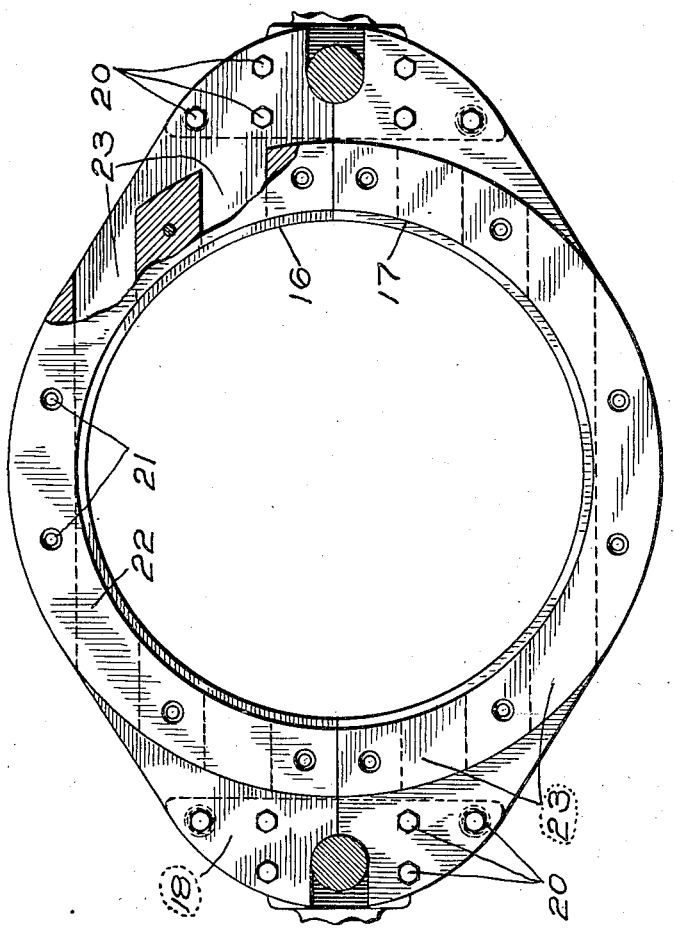
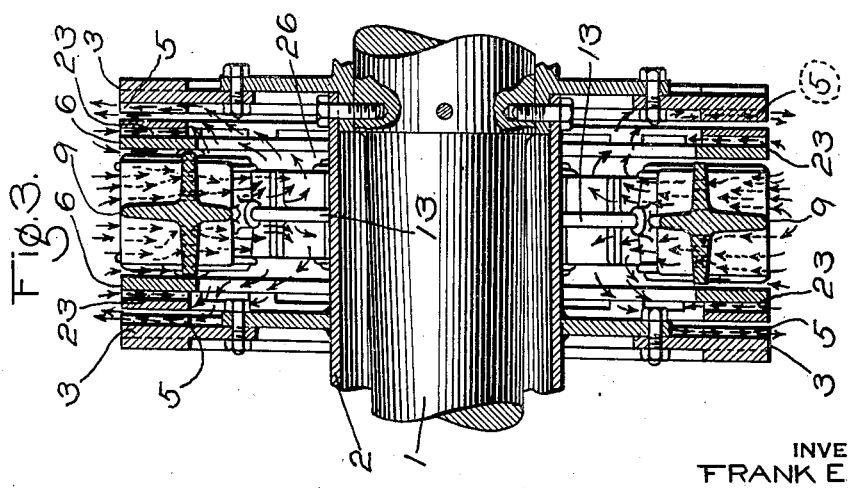
INVENTOR
FRANK E. MILLER
BY Wm. M. Cady
ATTORNEY Patented July 11, 1939

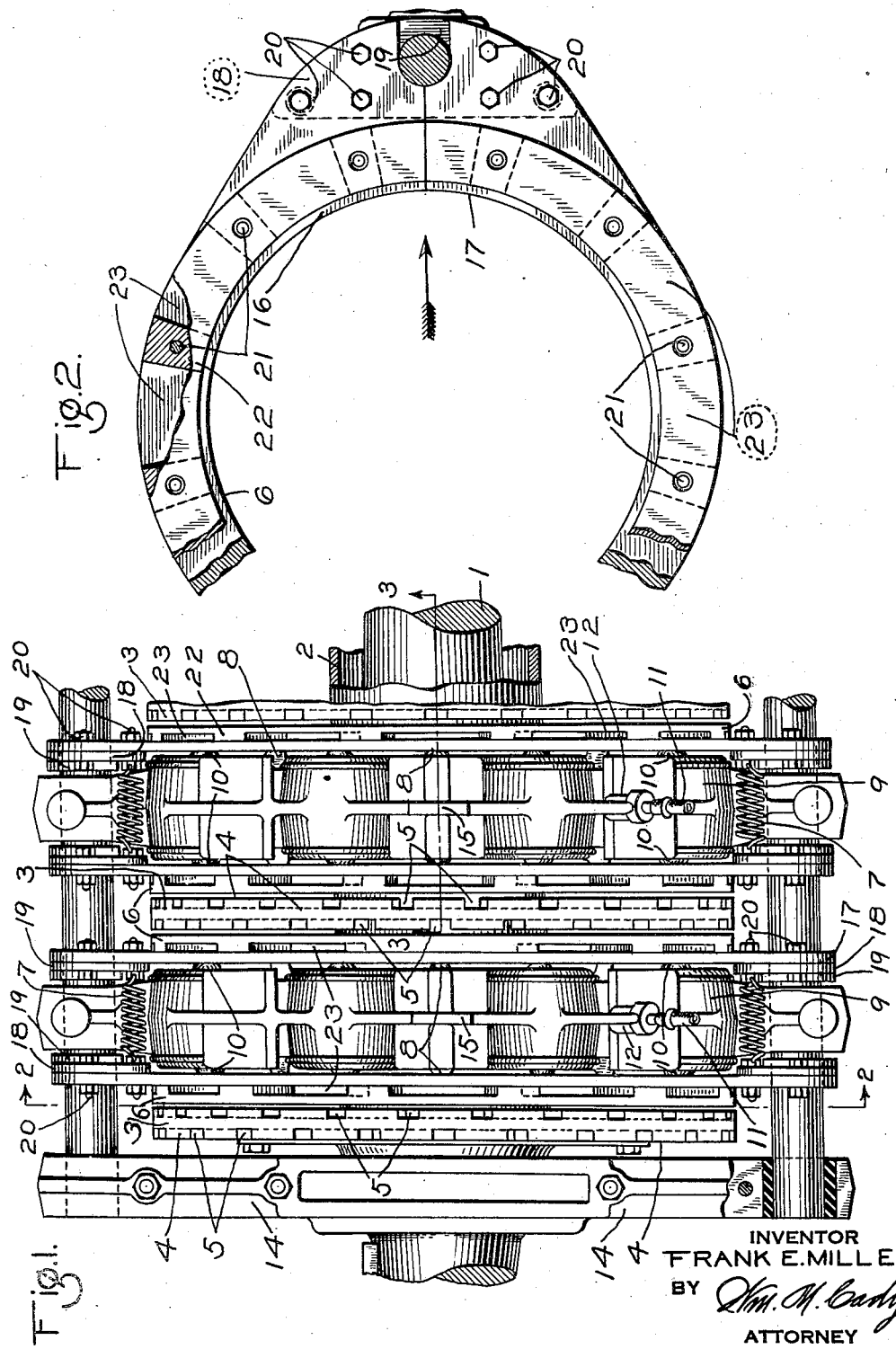

2,165,978

UNITED STATES PATENT OFFICE 2,165,978

BRAKE MECHANISM

Frank E. Miller, Swissvale, Pa., assignor to The Westinghouse Air Brake Company, Wilmerding, Pa., a corporation of Pennsylvania Application December 17, 1937, Serial No. 180,347

7 Claims. (Cl. 188—264)

This invention relates to friction disk brake mechanisms of the type disclosed in a joint application of Clyde C. Farmer and Joseph C. Mc-Cune, Serial No. 170,240, filed October 21, 1937, and more particularly to the cooling system of the mechanism.

The disk brake mechanisms disclosed in the above mentioned joint application comprises rotatable brake elements which are secured to a tubular member rigidly attached to the axle of a wheel and axle assembly of a railway vehicle truck so as to rotate with the axle, non-rotatable brake elements which encircle the axle and which are movable into frictional braking engagement with the rotatable brake elements by fluid pressure actuated brake cylinder devices which also encircle the axle.

In the above construction the tubular member, each brake cylinder device, the adjacent two rotatable brake elements and the two non-rotatable brake elements which are adapted to engage with said rotatable brake elements, define an air chamber which is open to the atmosphere by way of openings in the brake cylinder device and through the space between each non-rotatable brake element and the adjacent side of the brake cylinder device. With the several parts of the mechanism in release position this chamber is also connected to the atmosphere by way of the space between the friction faces of the rotatable and non-rotatable brake elements and by way of radially arranged grooves provided in the friction faces of the rotatable brake elements. With the friction faces of the rotatable and non-rotatable brake elements in frictional engagement with each other the last mentioned communication from the chamber to the atmosphere will be by way of the grooves only.

While the wheel and axle assembly is rotating, the friction braking faces of the rotating brake elements which have the grooves communicating with the chamber above described act as fans to draw air from the chamber and pass such air across the interengaging faces of the rotatable and non-rotatable brake elements to the atmosphere. As air is thus being drawn from the chamber, air from the exterior of the mechanism flows to the chamber by way of the openings provided in the brake cylinder devices as well as by way of the space between each side of the brake cylinder device and the adjacent non-rotatable brake element.

The principal object of the present invention is to provide improved heat dissipating means for a friction disk brake mechanism of the above mentioned type.

Another object of the invention is to provide improved heat dissipating means for a friction brake element of a friction disk brake mechanism.

Other objects and advantages will appear in the following more detailed description of the invention.

In the accompanying drawings Fig. 1 is a fragmentary plan view, partly in section, of a disk brake mechanism embodying the invention; Fig. 2 is a fragmentary sectional view taken on the line 2—2 of Fig. 1, portions of the brake mechanism being omitted to more clearly illustrate the invention; Fig. 3 is a fragmentary longitudinal sectional view of the mechanism taken on the line 3—3 of Fig. 1 and Fig. 4 is a sectional view which is similar to Fig. 2 but which illustrates a modification of the invention.

As shown in Figs. 1 and 3 of the drawings, the disk brake mechanism may, with the exception of the non-rotatable brake elements hereinafter fully described, be identical with the brake mechanism disclosed in the aforementioned pending joint application.

The disk brake mechanism and the manner of associating it with the truck frame and a wheel and axle assembly of a railway vehicle truck may be substantially the same as disclosed in the aforementioned pending joint application, the mechanism as shown in Figs. 1 and 3 being mounted on the axle 1 of the wheel and axle assembly. The wheels of the assembly and the truck frame form no part of the present invention and have therefore been omitted from the drawings.

Since the brake mechanism for the most part is identical with the mechanism disclosed in the aforementioned pending application only a brief description thereof in the present application is deemed necessary to a clear understanding of the invention.

As shown, the mechanism may comprise a tubular member 2 which extends longitudinally of and encircles the axle 1 of the wheel and axle assembly. At each of its ends the member 2 is secured to the axle so as to rotate therewith. The brake mechanism may further comprise spaced circular brake elements 3 which encircle and are rigidly secured to the tubular member 2 in any desired manner so as to rotate therewith. Each of these brake elements may be provided on each side with a frictional braking face which is divided into a plurality of friction braking surfaces 4 by spaced radially extending cross grooves 5, which grooves, on one side, are arranged in staggered relation to the grooves on the other side.

Disposed between each pair of friction braking faces of the brake elements 3 are two non-rotatable brake elements 6 which encircle the axle 1 and which are each adapted to be moved in directions longitudinally of the axle 1 into and out of frictional braking engagement with the adjacent brake element 3. These non-rotatable brake elements are normally maintained out of frictional braking engagement with the rotatable brake element by release springs 7, the non-rotatable brake elements in their release position being engaged by stops 8 carried by a substantially annular brake cylinder device 9 which is interposed between each two non-rotatable brake elements and which encircles the axle 1.

Each brake cylinder device 9 may comprise a plurality of radially arranged spaced brake cylinders of small diameter which are so disposed that their axes extend parallel with the axis of the axle 1. Contained in each brake cylinder are two oppositely facing pistons (not shown) having piston stems 10 which are adapted to operatively engage the adjacent faces of the non-rotatable brake elements. These pistons and thereby the piston stems 10 are movable outwardly in opposite directions to each other in response to the pressure of fluid supplied to the pistons by way of connected conduits 11, 12 and 13. The piston stems as they are thus actuated move the non-rotatable brake elements 6 into frictional braking engagement with the rotatable brake elements 3. When fluid under pressure is released from the brake cylinder the release springs 7 move the non-rotatable brake elements 6 and thereby the piston stems 10 and pistons to their normal release position as shown in Figs. 1 and 3, the stops 10 limiting the release movement of the non-rotatable brake elements.

The non-rotatable brake elements 6 and brake cylinder devices 9 are carried by a supporting structure 14 which is journaled on the axle 1, the non-rotatable elements being slidably mounted on the structure and the brake cylinder devices being rigidly secured to the structure. Rotation of the supporting structure and the several parts of the mechanism carried thereby may be held against rotation in the same manner as in the apparatus disclosed in the aforementioned pending application. It should here be mentioned that while the rotation preventing means is not fully illustrated, the upwardly extending lugs 15 of the brake cylinder devices are adapted to be engaged by a member (not shown) rigidly secured to the truck frame, as disclosed in the pending application.

Each non-rotatable brake element 6 may comprise upper and lower vertically aligned plates 16 and 17, respectively, which are clamped together and to the flange 18 of a bracket member 19 by bolts 20. Secured to each of the plates by countersunk rivets 21 is an annular brake shoe 22 which may comprise two segmental members which are held together in end to end relationship with each other by the connected plates 16 and 17.

The friction braking surface which is provided on the front of the brake shoe 22 is plain and in effect continuous throughout the circumference of the shoe and is adapted to frictionally engage with the friction braking surface of the adjacent rotatable brake element 4. The back of the brake shoe is provided with spaced grooves 23 which are open to both the inner and outer edges of the shoe. Between these grooves the brake shoe is rigidly secured in engagement with the plates 16 and 17 by the rivets 21 as shown in Fig. 2.

As shown in Fig. 3 the tubular member 2, two adjacent rotatable brake elements 3, two non-rotatable brake elements 6 which are adapted to cooperate with the two rotatable brake elements, and the brake cylinder 9 disposed between the non-rotatable brake elements define a chamber 26 which is in communication with the atmosphere by way of the grooves 23, the space between each side of the brake cylinder device and the adjacent side of the adjacent non-rotatable brake element 6, the openings provided in the brake cylinder device and the grooves 5 in the rotatable brake element.

The brake elements 3 when rotating act as fans to draw air from the chamber 26 and to pass such air across the braking forces of both the rotatable and non-rotatable brake elements 3 and 6 as in the apparatus disclosed in the aforementioned pending joint application.

As air is being drawn from chamber 26 air flows from the atmosphere to said chamber by way of the spaces between the opposite sides of the brake cylinder device and the two adjacent non-rotatable brake elements 6, and also through the openings in the brake cylinder device and the grooves 23.

It will here be noted that the air passing through the grooves 23 will act to dissipate heat from the brake shoes 22 and will also prevent to a large extent transmission of heat from the brake shoe to the plates 16 and 17 and thereby to the brake cylinder device. Heat may be transmitted to the plates 16 and 17 by way of the portions of the shoe which are in contact with the plates and the air flowing through the grooves 23 will assist in dissipating such heat from the plates.

Assuming now that the vehicle to which the mechanism is applied is traveling in the direction indicated by the arrow shown in Fig. 2, air will be forced through the grooves 23 on the front side of the non-rotatable element so that the dissipation of heat will be much more effective than if the action of the rotatable brake element were wholly relied upon to cause such flow.

In Fig. 4 a modification is illustrated in which the grooves 23 instead of being radially arranged are arranged parallel with the path of travel of the vehicle.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a brake mechanism, in combination, a rotatable member to be braked having a friction braking face, a non-rotatable braking element having a friction braking face, means for moving said element into frictional braking engagement with said member, means embodied in the braking face of said member for drawing air from the interior of said mechanism across the braking faces of said member and element, and said element having air conduits through which air is supplied to the interior of said mechanism.

2. In a brake mechanism, in combination, a rotatable member to be braked having a friction braking face, a non-rotatable braking element having a friction braking face, means for moving said element into frictional braking engagement with said member, means in the braking face of said member for drawing air from the interior of said mechanism across the braking faces of said member and element, and said element having air conduits to the rear of the braking surface thereof through which air is supplied to the interior of said mechanism.

3. In a brake mechanism, in combination, an annular rotatable member to be braked having a friction braking face, an annular non-rotatable braking element having a friction braking face, means for moving said element into braking engagement with said member, said member having a plurality of spaced radial grooves formed in its braking face and connecting the interior of said mechanism to the exterior thereof which grooved construction upon rotation of said member draws air from the interior of said mechanism, said element having a plurality of openings connecting the exterior of said mechanism to the interior thereof through which air is adapted to be supplied to said interior.

4. In a brake mechanism, in combination, a rotatable member having an annular braking surface and a plurality of grooves extending across said surface from the interior to the exterior thereof in a generally radial direction, a non-rotatable braking element having a flat substantially continuous braking surface adapted to frictionally engage the braking surface of said member, means for moving said element into frictional engagement with said member, which grooved construction is adapted upon rotation of said member to draw and conduct air from the interior of said mechanism to the exterior thereof across said braking surfaces, and said element having a plurality of spaced air conduits adjacent its braking surface for conducting air from the exterior of said mechanism to the interior thereof.

5. In a brake mechanism, in combination, rotatable means adapted to be braked, a member encircling said means and secured thereto for rotation therewith and having an annular braking surface, a non-rotatable element encircling said means and having an annular braking surface adapted to frictionally engage that of said member, brake cylinder means connected to said element and operative by fluid under pressure for moving said element relative to said member to bring said braking surfaces into frictional engagement, means associated with said member for forcing air from the interior of said mechanism across said braking surfaces to the exterior of said mechanism for dissipating heat from said surfaces, said element having air conduits spaced from the braking surface thereof for supplying air from the exterior to the interior of said mechanism, and space being provided between said element and brake cylinder means and around said brake cylinder means through which air is also adapted to be supplied from the exterior to the interior of said mechanism.

6. In a brake mechanism, in combination, rotatable means adapted to be braked, two spaced, disk like elements secured to and rotatable with said means, a brake shoe secured to each disk element and having an annular braking surface and a plurality of spaced grooves extending across said surface in a generally radial direction, two spaced annular, non-rotatable braking members disposed between said brake shoes and each having a braking surface for engagement with the braking surface of the adjacent brake shoe, an annular fluid pressure operated brake cylinder arrangement disposed between said braking members and having an operating connection with said non-rotatable braking member for moving same toward said brake shoes for effecting frictional braking contact between said braking surfaces, said disk like elements forming closed ends of a substantially cylindrical chamber the sides of which is formed by said non-rotatable braking members and brake cylinder arrangement, said grooves being adapted upon rotation of said shoes to conduct air from said chamber across said braking surfaces to the exterior of said device, said non-rotatable braking members having air conduits spaced from the braking surfaces thereof for conducting air from the exterior of said mechanism to said chamber.

7. In a brake mechanism, in combination, a rotatable member to be braked, a non-rotatable brake element, actuating apparatus for causing said member and element to frictionally engage with each other, means associated with said rotatable member for causing air to flow across said elements, conduits in said non-rotatable element through which fluid flows to said means, said apparatus and non-rotatable element providing spaces through which air flows to said means to minimize the transmission of heat to the apparatus.

FRANK E. MILLER.